US012102065B2

(12) United States Patent
Cira et al.

(10) Patent No.: US 12,102,065 B2
(45) Date of Patent: Oct. 1, 2024

(54) COASTAL RESILIENCE SYSTEMS, STRUCTURES, AND METHODS

(71) Applicant: Gabriel Cira, Cambridge, MA (US)

(72) Inventors: Gabriel Cira, Cambridge, MA (US); Jenna Tegeler, Cambridge, MA (US)

(73) Assignee: The Emerald Tutu Inc., Cambridge, MA (US)

( * ) Notice: Subject to any disclaimer, the term of this patent is extended or adjusted under 35 U.S.C. 154(b) by 0 days.

(21) Appl. No.: 17/782,636

(22) PCT Filed: Dec. 4, 2020

(86) PCT No.: PCT/US2020/063500
§ 371 (c)(1),
(2) Date: Jun. 3, 2022

(87) PCT Pub. No.: WO2021/113783
PCT Pub. Date: Jun. 10, 2021

(65) Prior Publication Data
US 2023/0007942 A1     Jan. 12, 2023

Related U.S. Application Data

(60) Provisional application No. 62/943,935, filed on Dec. 5, 2019.

(51) Int. Cl.
*A01K 61/60* (2017.01)
*E02B 3/06* (2006.01)

(52) U.S. Cl.
CPC .............. *A01K 61/60* (2017.01); *E02B 3/062* (2013.01)

(58) Field of Classification Search
CPC .......... A01K 61/60; E02B 3/062; Y02A 40/81
See application file for complete search history.

(56) References Cited

U.S. PATENT DOCUMENTS 3,138,135 A    6/1964  Langer
8,037,838 B2*  10/2011 Oigarden ................ B63B 21/50
                                                    114/230.1
(Continued)

FOREIGN PATENT DOCUMENTS

JP         8133178      5/1996
KR     2003-0086414    11/2003

OTHER PUBLICATIONS

WIPO/PCT International Search Report, Opinion, and Search Strategy for Appln: PCT US20 63500 filed Dec. 4, 2020, ISA/US (14 pp.).

(Continued)

*Primary Examiner* — Carib A Oquendo
(74) *Attorney, Agent, or Firm* — Maura K. Moran; Cambridge Technology Law LLC

(57) ABSTRACT

A coastal resilience system for disrupting wave energy and storm surge flux and allowing accumulation of tidal-borne sediment has an interconnected network of biomatter-heavy floating mats positioned in water near a shoreline, and an interconnection subsystem with connection lines flexibly connecting adjacent floatable mats. Lines may be connected, at a plurality of force transfer points or regions within or near the interior of the mat, to other interconnection components positioned within the mat. In some embodiments, mats have yoke sites spaced around their edges and a connection line extends in a straight line from a first yoke site, through the interior of a mat, and to a second yoke site. The connection lines may intersect at an intersection position in the interior of the floatable mat, multiple connection lines may extend across the interior of the mat, but not always through a center of the interior of the mat.

24 Claims, 7 Drawing Sheets

(56) References Cited

U.S. PATENT DOCUMENTS

| | | |
|---|---|---|
| 2005/0183331 A1 | 8/2005 | Kania |
| 2009/0139927 A1* | 6/2009 | Kania ................. A01G 31/00 210/242.1 |
| 2014/0251225 A1 | 9/2014 | Heo |

OTHER PUBLICATIONS

KR_2003-0086414_Assum Ecological English Translation of Abstract (1 pp.).

JP 8-133178 Denki Joki English Translation of Abstract (1 pp.).

Emerald Tutu, "MIT Climate Changed Ideas Competition: Emerald Tutu [Overall Winner]," Transcript and selected screenshots from video, dated May 4, 2018, downloaded Oct. 30, 2020 https://www.youtube.com/watch?v=14LUx2bRquU&feature=youtu.be (11 pp.).

Cira, Proposal Narrative for entry into The Climate Changed Ideas Competition at the Massachusetts Institute of Technology (MIT), Text submitted by Gabriel Cira to MIT, Feb. 15, 2018 (1 pp.).

Cira, Modeling Narrative for entry into The Climate Changed Ideas Competition at the Massachusetts Institute of Technology (MIT), Text submitted by Gabriel Cira to MIT, Feb. 15, 2018 (1 pp.).

Emerald Tutu, Content from Emerald Tutu website, 2 pp, downloaded Nov. 2, 2020, from https://emerald-tutu.com/ (2 pp.).

Emerald Tutu, "The Emerald Tutu," presentation, vimeo.com, dated Jun. 7, 2019, downloaded from https://vimeo.com/266553400 (5 pp.).

Walpole, "ASCE Announces 2019 Innovation Contest Honorees," ASCE News, dated May 22, 2019, downloaded Oct. 30, 2019 from https://news.asce.org/asce-announces-2019-innovation-contest-honorees/ (5 pp).

Cira et al., "Nearshore Soft Infrastructure for Coastal Climate Resilience and Inhabitable Floating Landscape," Project Summary Report, dated Jun. 23, 2019 (8 pp.).

Cira et al., "The Emerald Tutu," Presentation to ASCE on Jun. 23, 2019 (24 pp.).

ASCE, "Sustainable, Climate-Resilient Floating Landscape Infrastructure Earns Top Prize At ASCE Innovation Contest," ASCE Press Release, dated Jul. 28, 2019 (3 pp.).

Walpole, "ASCE Innovation Contest Winners Find Real-World Solutions," ASCE Civil Engineering Source, dated Jun. 29, 2019, downloaded Oct. 30, 2019, from https://source.asce.dev/asce-innovation-contest/ (2 pp.).

Fabris, "Floating landscape infrastructure wins top ASCE innovation prize," Building Construction and Design The Weekly, dated Jul. 26, 2019, downloaded Oct. 30, 2020, from https://www.bdcnetwork.com/floating-landscape-infrastructure-wins-top-asce-innovation-prize (9 pp.).

"The Emerald Tutu wins NSF grant for design to protect Boston's coastline," MIT News, Downloaded Jun. 2, 2022, from https://news.mit.edu/2020/emerald-tutu-design-wins-nsf-grant-protect-boston-coastline-0903 (4 pp).

Northeastern University, "Julia Hopkins Is Lead Scientist On New NSF Grant For 'Emerald Tutu'," NEU College of Engineering website, dated Sep. 29, 2020, downloaded Oct. 30, 2020, from https://coe.northeastern.edu/news/julia-hopkins-is-lead-scientist-on-new-nsf-grant-for-emerald-tutu/ (4 pp.).

"Award Abstract # 2016199 SBIR Phase I: The Emerald Tutu," dated Aug. 1, 2020, downloaded Nov. 12, 2020, from the National Science Foundation website at https://nsf.gov/awardsearch/showAward?AWD_ID=2016199&HistoricalAwards=false (2 pp.).

Moran, Statement Regarding Content In Pre-Dec. 5, 2018, Disclosures, Jun. 3, 2021 (5 pp.).

* cited by examiner

FIG. 3E1
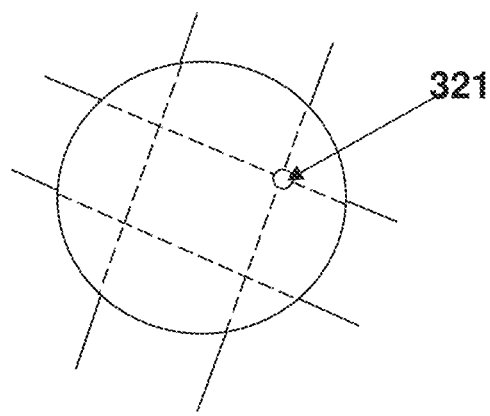
FIG. 3E2
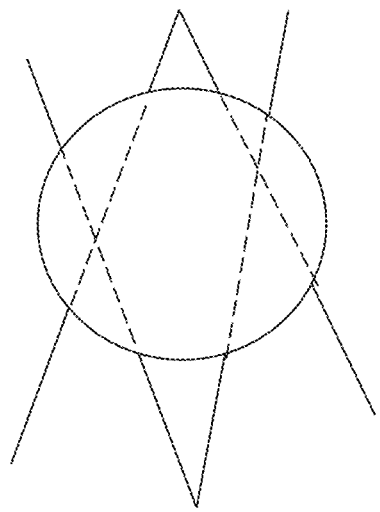
FIG. 3F
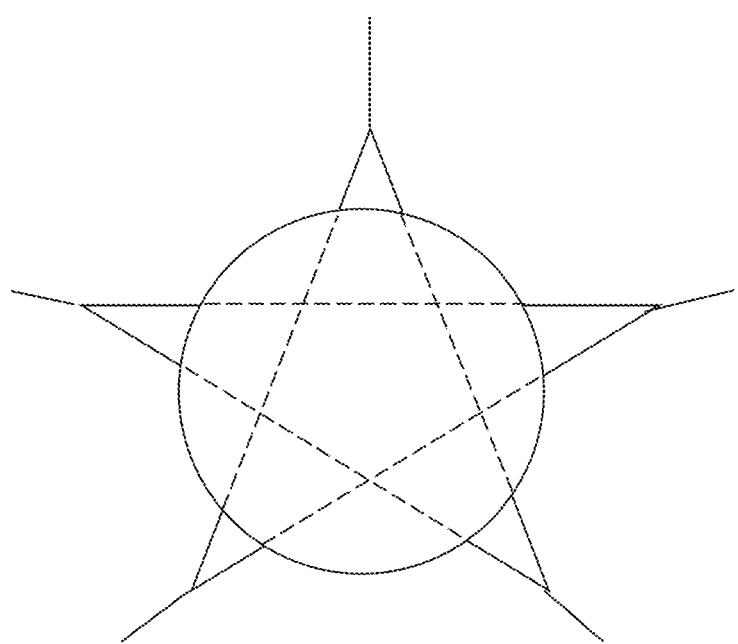

COASTAL RESILIENCE SYSTEMS, STRUCTURES, AND METHODS

CROSS-REFERENCE TO RELATED APPLICATION

This application claims the priority:

of U.S. Patent Application No. 62/943,935, filed Dec. 5, 2019, and entitled "Nearshore Anchored Network of Biomatter-growth Floating Mats: Deployable "Kit of Parts" Infrastructure for Coastal Climate Resilience and Coastal Flood Protection, a Marine Landscape Amenity with Environmental Co-Benefits," and of PCT Patent Application PCT US20/63500, filed Dec. 4, 2020, and entitled "Coastal Resilience Systems, Structures, And Methods," for which this application constitutes its entry into the PCT National Phase, the disclosure of both of which are incorporated by reference herein in their entirety.

FIELD

The present invention relates to the field of control of coastal vulnerabilities and flooding and particularly to the fields of coastal climate resilience, coastal flood protection, and tidal-borne sediment control.

BACKGROUND

For many communities that are located near costal shores, coastal climate resilience and coastal flood protection are becoming problems that are increasing in scope in the face of climate change.

As coastal hazards worsen with climate change, in particular rising sea levels and intensified storms, cities and other coastal stakeholders need expedient solutions for localized protection and resilience. In particular, solutions need to developed that will disrupt wave energy and storm surge flux, storm surge being the sharp influx of atmospheric-pressure-driven water during storms. Historically, coastal vulnerabilities and flooding have been controlled by adaptation measures to protect land from the intensified coastal hazards of flooding and storm damage, which are two major factors in coastal flooding from oceanic conditions that will worsen with climate change.

Such measures have included physical barriers to storm-enhanced ocean waves and storm surge. Such barriers are often heavy engineered blockades such as seawalls, dolos, levees, landmoving, barge-like floating islands, or other engineered solutions that tend to be based on steel, concrete, or other hydrocarbon-seeping or heavy materials or difficult or costly to maintain/operate. In addition, installing them typically requires costly (and carbon-intensive) earthmoving projects that disrupt the natural shoreline and potentially harm fragile coastal ecosystems and species. Further, they often are unsightly and impede natural access to the shore by the community. Many infrastructure proposals for sea gates and seawalls that protect cities rely on blocking water flows, which has been shown to degrade water quality considerably and have enormous cascading environmental impacts. In short, such barriers can be detrimental to the environment and the community.

Other measures include the installation of floating greenery resilience projects. Such resiliency projects tend to fall into two categories: A) large engineered infrastructural floating parks, designed to physically block storm action while allowing human inhabitation (with the same drawbacks already described for heavy engineered blockades), and B) small scale light floating planters that emphasize the properties of bioremediation, erosion protection, or small wave blocking (while such measures provide certain community benefits in fair weather, they tend to be inefficient and ineffective in dissipating storm surge during major storm events).

In addition, now-common knowledge in localized protection and resilience indicate that effective measures should collectively operate with careful attention to positive environmental impact, and negative carbon footprint. As of 2020, many coastal cities are creating or have finished commissioned studies on the projected impacts of climate change, and are at a moment where they are trying to determine what measures can reasonably be implemented to protect their communities.

In addition, many coastal cities face the challenge of managing waterways into which tidal-borne sediment flows. Some communities find it difficult to control the sediment or accurately predict where it will go over time, and many places (beaches, marshes) are subject to "scouring" where sediment, especially sand, disappears over time or unexpectedly, for example, during or after a significant storm event.

It is desirable to have simple, convenient, and efficient systems and structures for coastal resilience that on the unit level have ruggedness and simplicity of manufacturing; on the infrastructural level, is modular, providing a kit-of-parts solution for developing easily constructed and maintained networks of flexible physical configuration and size, and on the network-scale provides effective and environmentally friendly coastal flood protection. It is further desirable to provide systems and methods to control tide-transported sediment, particularly to facilitate capturing and accumulating tide-transported sediment,

SUMMARY

A coastal resilience system for disrupting wave energy and storm surge flux is disclosed as having an interconnected network of living biomatter-heavy floating mats, an interconnection subsystem such as a yoke or more specifically a tension yoke, which may be formed of ropes or line and hub connections and may be arranged to connect the mats to each other, and an anchoring subsystem having anchoring lines and moorings to anchor the interconnection subsystem into position at the desired location.

In certain embodiments, a coastal resilience system may have an interconnected network of floatable mats arranged to be positioned in a body of water in a desired location near a shoreline. A selected mat may be arranged to support growth, attachment, or positioning of biomatter thereon or therein, and to be arranged to be at least partially submerged in the body of water.

The interconnection subsystem may also have a plurality of connection lines arranged to flexibly connect the selected mat to adjacent floatable mats. The subsystem may also have interconnection components arranged to be positioned within a selected mat and arranged to be connected, at a plurality of force transfer points or regions within or near the interior of the mat, to other interconnection components positioned within the selected mat. In other embodiments, a frictional connection may be provided between the selected connection line and the interior of the selected mat to reduce movement of the positioned interconnection components within the mat.

In certain embodiments, the selected mat may have a biomatter support substrate, at least a portion of which is arranged to be submersible in the body of water; and the biomatter support substrate may be arranged to support growth of semi-aquatic plants thereon or to support attachment of or positioning of marine animals thereon or therein. In further embodiments, the biomatter support substrate may have a simulated root system extending downwardly from the selected mat into the body of water. The simulated root system further may further have a plurality of strands attached directly or indirectly to the selected mat.

The selected mat may have an edge with at least three yoke sites spaced around and along the edge, with the yoke sites including a first yoke site and a second yoke site that is different and spaced apart from the first yoke site. The selected connection line may be arranged to extend in a straight line from the first yoke site through an interior of the selected mat, and to exit the selected mat through the second yoke site. In other embodiments, the selected connection line may extend in a straight line through the interior of the floating mat but not through a center of the interior of the floating mat.

In certain embodiments, hub connections may flexibly connect the connection lines to other connection lines or to an anchoring subsystem arranged to flexibly anchor the interconnected network into position at the desired location In other embodiments, at least one of the hub connections may be a first connection line that is passed through a loop of a second connection line. In further embodiments, the first connection line may be arranged after the looping to extend a selected length along the first connection line but in the opposite direction away from the looping. along the first connection line.

In certain embodiments, the selected connection line may be arranged to intersect with another connection line at an intersection position in the interior of the selected mat. In further embodiments, a mat node may be provided to connect the selected connection line and the other connection line at the intersection position.

In certain embodiments, yoke sites may be a third yoke site that is different and spaced apart from the first yoke site and the second yoke site, and the other connection line may extend from the third yoke site through the interior to the intersection position, and may be arranged to be secured at a mat node to the selected connection line at the intersection position.

In certain embodiments, the selected mat may have a third yoke site that is different and spaced apart from the first yoke site and the second yoke site, and a fourth yoke site that is different and spaced apart from the first yoke site, the second yoke site, and the third yoke site; and the other connection line may extend from the third yoke site, through the interior to the intersection position, and to the fourth yoke site. In other embodiments, the other connection line may extend in a straight line from the third yoke site, through the interior of the floating mat but not through a center of the interior of the floating mat, and to the fourth yoke site.

A method is also disclosed herein in which a selected mat is connected to adjacent mats in a network of floatable mats positioned in a body of water in a desired location near a shoreline, by positioning a plurality of interconnection components within an interior of the selected mat in the network of floatable mats, and connecting, at a plurality of force transfer points or regions within or near the interior of the selected mat, the positioned interconnection components to other interconnection components positioned within the selected mat. In certain embodiments, the positioned interconnection components may be bound to the mats by fostering growth of biomatter onto the mats or by facilitating capture and accumulation of tide-transported sediment on the mats.

In certain embodiments, a plurality of connection lines may be positioned within the selected mat across the interior of the selected mat along a plurality of straight lines that extend edge to edge across the interior of the selected mat.

Positioning the interconnection components may result in the formation of a desired number of connection loops along or near an edge of the selected mat for connecting the adjacent mats directly or indirectly and flexibly to the selected mat. In certain embodiments, the desired number of connection loops may be formed by connecting ends of a pair of a plurality of connection lines that extend adjacent to each other out of the interior to an exterior of the selected mat; and joining the ends with a connection node.

In other embodiments, in which the pair of the plurality of connection lines ends has a first connection line with a first end and a second connection line with a second end, the connection node may join the first end and second end by looping the first end of the first connection line over the second end of the second connection line. In further embodiments, after the looping, the first end may be extended a selected length along the first connection line but in the opposite direction away from the looping.

In certain embodiments, at least one of the desired number of connection loops may be formed by positioning a length of connection line within the selected mat across the interior of the selected mat along a pair of the straight lines extending edge to edge across the interior, with the pair comprising a first straight line and a second straight line. The first straight line may have an end located on the edge of the selected mat at a first yoke site, and the second straight line may have a beginning located on the edge of the selected mat at a second yoke site that is adjacent on the edge to the first yoke site.

The loop may be formed by extending the length of connection line along the first straight line out of and away from the selected mat at the first yoke site, extending loosely away from and back to the selected mat, and entering the interior of the selected mat at the second yoke site. In further embodiments, the plurality of connection lines may be a single connection line that is positioned in the selected mat across the straight lines.

In certain embodiments, when one straight line intersects with another straight line at an intersection position, a mat node may be used to connect the connection lines positioned in the intersecting straight lines at the intersection. In further embodiments, the mat node may connect the connection lines positioned in the intersecting straight lines by looping the one connection line over the other connection line.

The disclosed apparatuses, methods and systems are very adaptable and may be used to simply, conveniently, and efficiently to disrupt wave energy and storm surge flux and to capture and accumulate tide-transported sediment that could otherwise dissipate over time. Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate one (several) embodiment(s) of the invention and together with the description, serve to explain the principles of the invention.

BRIEF DESCRIPTION OF THE DRAWINGS

FIGS. 3E1 and 3E2 are top diagrammatic views of an assembled floating mat, and components of other illustrative but not necessarily preferred embodiments of an interconnection subsystem disposed in the mat, with four lines running through (shown in dashed lines) the mat and extending from (shown in solid lines) the mat;

FIG. 3F is a top diagrammatic view of an assembled floating mat, and components of another illustrative but not necessarily preferred embodiment of an interconnection subsystem disposed in the mat, with five lines running through (shown in dashed lines) the mat and extending from (shown in solid lines) the mat;

FIG. 3I showing an interconnection subsystem with a tension rope axis,

FIG. 3J showing an interconnection subsystem with a tension rope mesh,

FIG. 3K showing an interconnection subsystem with a rope network, and

FIG. 3L showing an interconnection subsystem with a rope mesh;

DETAILED DESCRIPTION

Reference will now be made in detail to the present exemplary embodiments of a coastal resilience system 100, examples of which are illustrated in the accompanying drawings. Wherever possible, the same reference numbers will be used throughout the drawings to refer to the same or like parts.

Coastal Resilience Systems

Figure 1A:
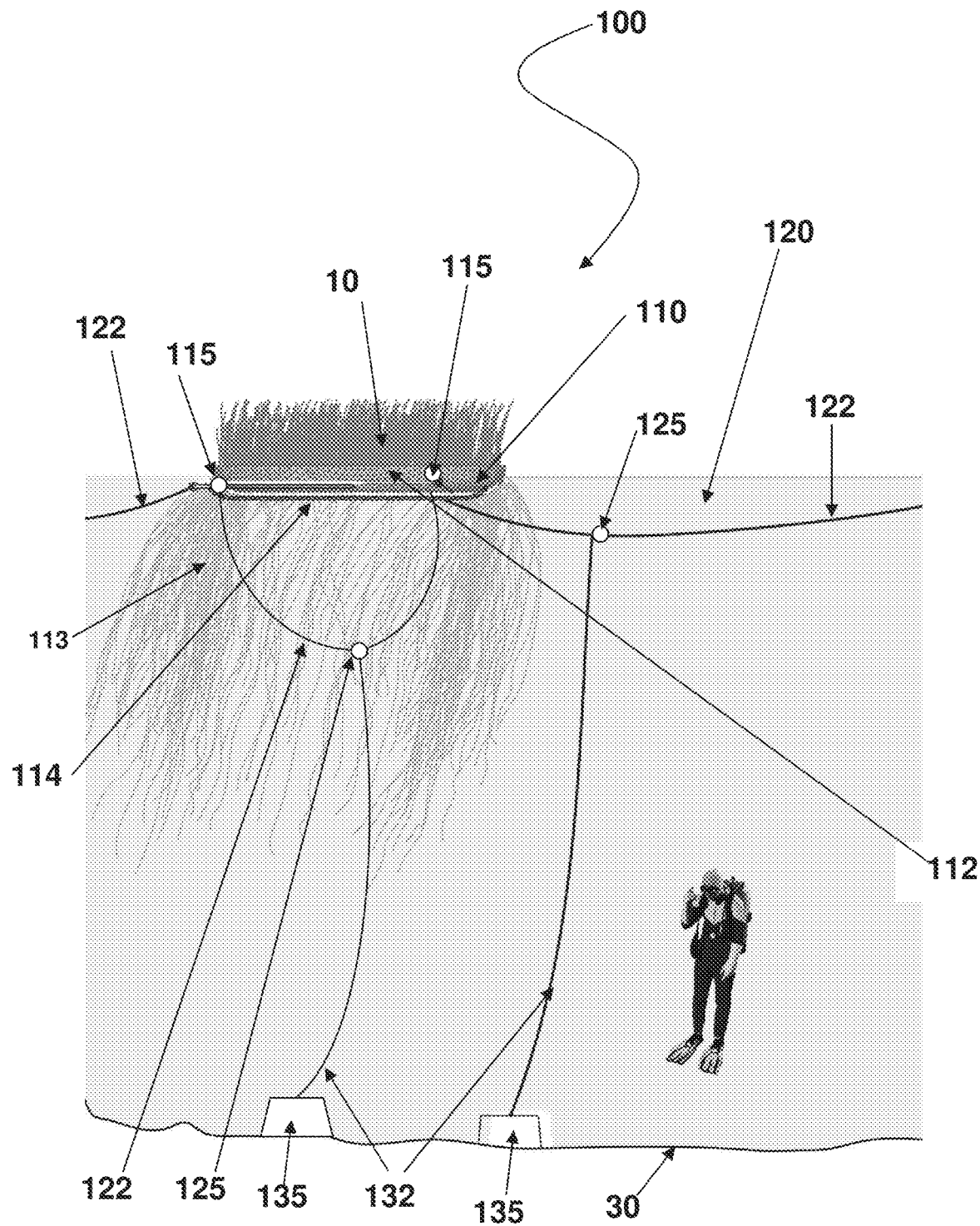
FIG. 1A is a perspective view of one portion of an illustrative but not necessarily preferred embodiment of a coastal resilience system 100 as installed in a body of water near a shoreline and arranged to disrupt wave energy and storm surge flux.
Figure 1B:
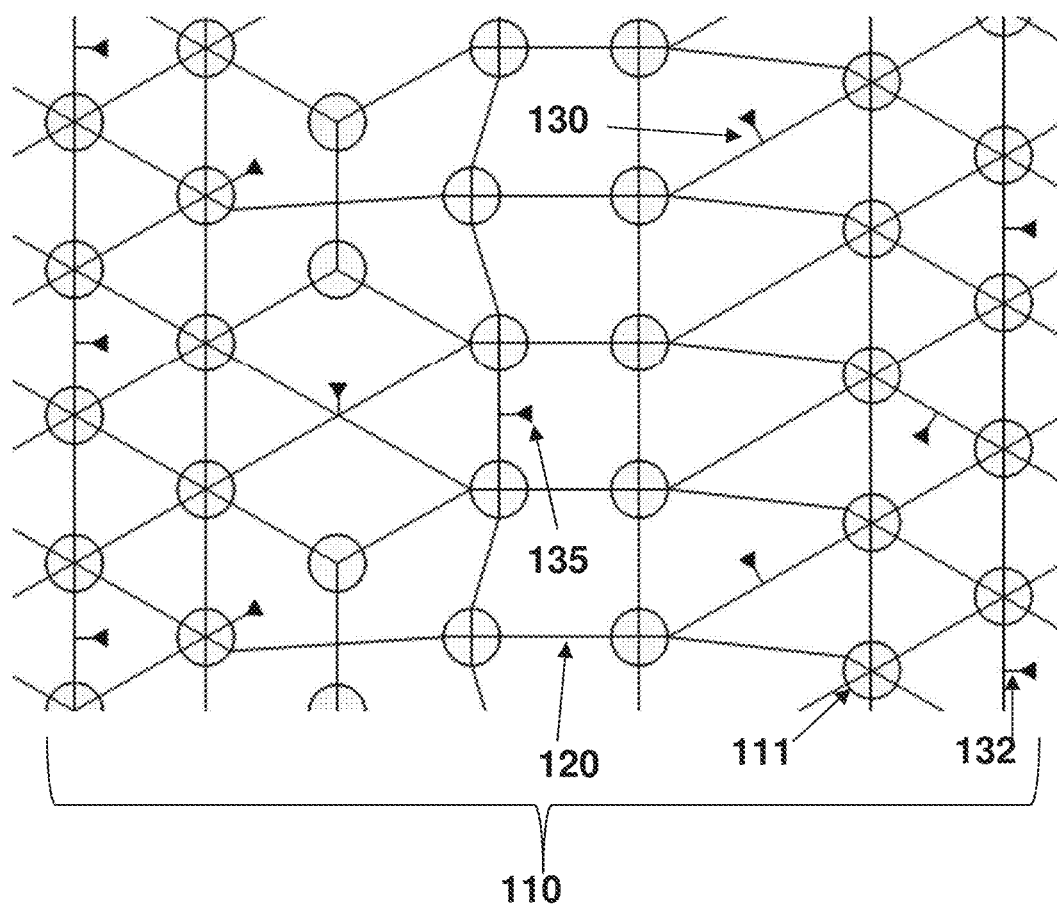
FIG. 1B is a top representational view of the assembled system 100 shown in FIG. 1A, including a network of floating mats 111 and an interconnection subsystem 120 that connects the mats 100 to each other and to an anchoring subsystem 130 for anchoring the interconnection subsystem into position at the desired location in the body of water.

FIGS. 1A and 1B show an illustrative but not necessarily preferred embodiment of a coastal resilience system 100, also known as a coastal climate resilience system or infrastructure, a wave strength reduction system, a storm surge impeding/reducing/mitigation system, a sediment control system, a sediment reduction system, or simply the system, which may be installed in a body of water near a coastal shoreline. The system 100, which is arranged to disrupt wave energy and storm surge flux, or, alternatively, to capture and accumulate tide-transported sediment, may have an interconnected network 110 of living biomatter-heavy floating mats 111 disposed in the desired location in the body of water, an interconnection subsystem 120 arranged to connect the mats 111 to each other, and an anchoring subsystem 130 to anchor the interconnection subsystem 120 in position in the desired location. The system 100 constitutes a nature-based approach to the problem of coastal flooding, according to the present invention.

As shown in FIG. 1A, which illustrates a portion of the system 100, a modular infrastructure-scale network 110 is formed of biomatter-grown mats 111, which may be constructed of a fibrous, porous mesh material for the growth of marsh grass and other semi-aquatic flora at the upper surface of said floating mats. In one embodiment, the mats may have a rough, and/or porous bottom surface material arranged to allow growth of seaweed and other aquatic marine life, these said materials being attached or bonded together. The mats 111 may be deployable anywhere in a potential flood area, at a shoreline, or nearshore waters to disrupt wind- or current-driven surface gravity waves and impede water flow such as from storm surge.

The system 100 may be arranged to provide a substrate for the controlled growth of biomatter, and especially for controlled growth of biomatter such as marsh grass and/or other semi-aquatic flora; and are interlinked. The interlinking provide a distribution of forces exerted on one or more mats during a storm event. The distribution of forces disrupts and reduces the intensity of ocean waves and retards storm surge. In certain embodiments, and as disclosed below, the network 110 is anchored at or near the bottom surface of a body of water at or near a coastal shore.

The infrastructure of the system 100 may be assembled, operated and maintained with modular and deployable components to significantly reduce on-shore flooding and associated damages; thus the infrastructure constitutes a nature-based, low-cost, low-carbon, largely self-operating approach to the problem of on-shore coastal flooding and associated damages and the build-up of tidal borne sediment.

Mats

FIG. 1A shows a floating mat 111 made of a fibrous or felt-like mesh substrate arranged to enable marsh grass 10 and other plants to grow into the mat and provide habitat for marine animals to attach themselves onto or position themselves into the mat. In certain embodiments, the mat 111 may have a dense mesh cover 112, also known as the enclosing layer, arranged to enable marsh grass 10 and other plants to grow into the mat, with their dense peaty root system growing throughout the mesh substrate and extending into the water below the mat.

In certain embodiments, the mat may have a biomatter support structure 113, also known as a biomatter support substrate, a structure, or a substrate, that may be integral with or attached to the mat. At least a portion of the substrate 113 may be arranged to be submersible in the body of water and which may be arranged to support growth of semi-aquatic plants thereon or to support attachment of or harborage for marine animals thereon or therein. The biomatter support structure 113 may be formed of a mass of material that has a rough or pocked or cratered surface conducive to support biomatter growth or allow marine animals harborage. It may be formed of any suitable material that may become waterlogged. It may have a regularly or irregularly honeycombed surface to provide the plant/animal anchoring or harborage. In certain embodiment, the substrate 113 may be fibrous (filled with straight, rigid fibers); in other embodiments, the substrate 113 may be formed of a tangle of stringy and fibrous materials.

The substrate 113 may be a simulated root system attached directly or indirectly to a bottom surface of the selected mat and extending downwardly from the selected mat into the body of water. It may be formed of a stringy natural or recycled material such as a plurality of strands, with the strands mimicking a natural root system such that certain biomatter (all manner of aquatic plants such as algae, (for example, without limitation, green algae and brown algae) and all kinds of marine animals (for example, without limitation, shellfish or barnacles) are enabled to attach themselves to the substrate 113 or position themselves into or onto the substrate.

The mat 111 may become waterlogged, but the biomatter is self-buoyant, causing the mats to stay afloat without relying on large air bladders or hulls. In certain embodiments such as the one shown in FIG. 1A, the mat 111 may be a flattened sphere, but in other embodiments, the mat may be any 3D shape (flattened or not, and with or without rounded edges), such as a polyhedron. ovoid, or cylinder. The mat may be also formed into a torus, or of any 3 dimensional shape with one or more holes extending through or almost completely through the mat. Further, the mat may be formed of regular or irregularly shaped 3D objects encased with a porous cover, such as a pouch or sac, so that its surface is bumpy. Bumpier surfaces may be particularly conducive to support biomatter growth.

Also, in certain embodiments such as the one shown in FIG. 1A, the mat 111 may have a hard but porous surface bottom 114 that is affixed to the underside of the mat 111, and that curves up around the exterior edge of the mat 111 for added ruggedness and unit edge protection. The hard bottom surface may be formed of a recycled plastic layer; it may be fused to the dense mesh of the mat 111. Other suitable materials include but are not limited to fiberglass, polyurethane, textiles, and foams.

The bottom surface may be arranged to attract growth from various native seaweeds and other aquatic plant and animal life such as shellfish and algae and to encourage seaweed seeds and other lithiophilic marine life to affix onto the bottom surface of the mat.

The mats may also have yoke sites 115, also known as sites, yoke points, strut connections, or points, disposed near the edge of the mat for a tension yoke component to be connected thereto.

Interconnection Subsystem (Lines and Hub Connections)

FIG. 1A also shows an interconnection subsystem 120 that may be a yoke or a tension yoke and formed of a selected number links for interconnecting the mats into a network of inertia-based wave strength and storm surge dampeners. of flexible rope-like connection lines 122 (also known as ropes, yoke ropes, and lines) and hub connections 125 (also known as nodes, yoke nodes, and junctions). The lines 122 may have variable lengths and are arranged to interconnect the mats and to connect the network of mats to the anchoring subsystem 130 through yoke sites 115 and node junctions 125.

In certain embodiments, the yoke ropes associated with a selected mat attach at one end to yoke sites on the outer edge of the mat, with a selected rope associated with a selected yoke site, using any conventional attachment mechanism. In other embodiments, such as the system 100 shown in FIGS. 1A, 1B, the lines may be embedded in the mat; for example, they may be embedded in the thickness of the dense mesh, or they may be sandwiched between the hard bottom and the dense mesh. Further, the end of the yoke ropes that are embedded within the mat may be joined, as shown in dashed line in FIG. 2, at a mat node 222 positioned in the interior of the mat at the center of the mat 111.

As shown in FIG. 1A, 1B, two or more mat-edge yoke points themselves may be connected to each other by the yoke. In the embodiment of system 100, the tension yokes are shown with three equally spaced yoke points, 120 degrees apart. Such placement does not preclude similar hub-based, linear, web-like, or ring-like links (not shown) with any number of edge-connection points. Fundamentally, the yoke ropes or other parts of the tension yoke extend through the mat such that forces applied to the yoke ropes are distributed and transferred through the volume of the mat rather than transferred by the yoke rope to a single point. Ropes, rigid or semi-rigid parts, miscellaneous nautical hardware, plastic meshes, and other kinds of rigging may be possible materials for this component; these or other materials with similar properties.

After exiting the mat, a rope 122 may extend from the mat to a hub connection 125 at the rope's outwardly extending end, with the hub connection arranged to connect to an outwardly extending end of another rope 122 connected to an adjacent mat 111 or to the anchoring subsystem 130, described below. As shown in FIG. 1A, multiple ropes 122 from a single mat 111 also may be connected to each other at a hub connection 125 to indirectly connect the mat at two yoke points 115 to the anchoring subsystem 130.

It is to be understood that, at the election of a designer, instead of all of the yoke ropes that pass though the mat meeting at a hub connection 222, at least one pair of ropes 122 may be replaced by a single extended yoke rope that enters the mat at one yoke site, passes through the center of the mat, and exits the mat at another yoke site. As will be seen below, the number of the ropes extending from a mat, points 115, nodes 125, and moorings 130 is not limited to three; the number is left to the discretion of the system designer.

When an even number of yoke ropes pass through the center of the mat described above, again at the election of a designer, all of the pairs of nodes may be replaced by extended yoke ropes (one for each pair), that enter the mat at one yoke site, pass though the center of the mat, and exit the mat at another yoke site. In this embodiment, the node 222 may be constructed in the same fashion as the node 325 described below, with the extended yoke ropes looping over each other at their intersection position, thus reducing or eliminating any need for additional hardware at or in the node 222. In certain embodiments, the extended yoke ropes may be formed of or encased by a low friction material at the intended intersection position to minimize rubbing and/or slipping at the intersection position.

In addition, the tension yoke may itself be assembled from multiple parts to ease embedding in or affixing to the mat. The embedded yoke components may be textured, burred, or fitted for adhesion to the dense mesh material and/or to the bottom material. The entire mat assembly may be fabricated in a manufacturing facility or any other space easily and at quantity.

In another illustrative but not necessarily preferred embodiment of a coastal resilience system 300, shown in FIGS. 3A-3D, an interconnection system 320 (which may be formed of the same materials as yoke 120) may also have multiple ropes 322 embedded in the substrate of a mat 311 (which may also be formed of the same materials as mat 111).

Figure 2:
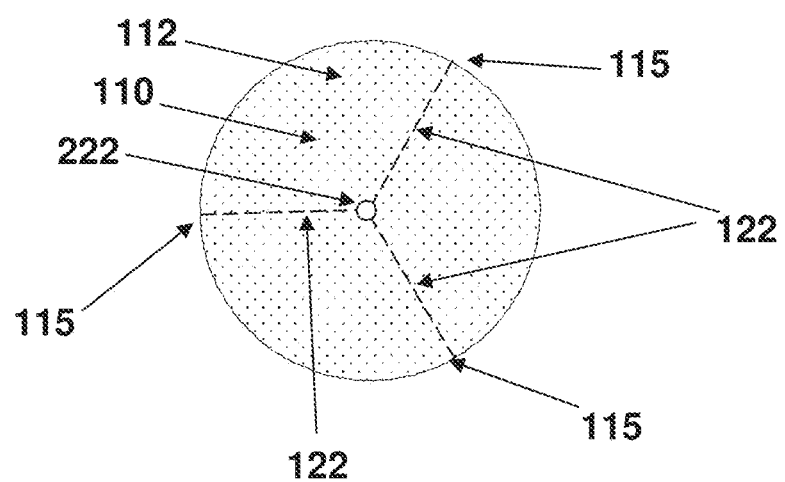
FIG. 2 is a top diagrammatic view of one of the floating mats 111 shown in FIGS. 1A and 1B.
Figure 3A:
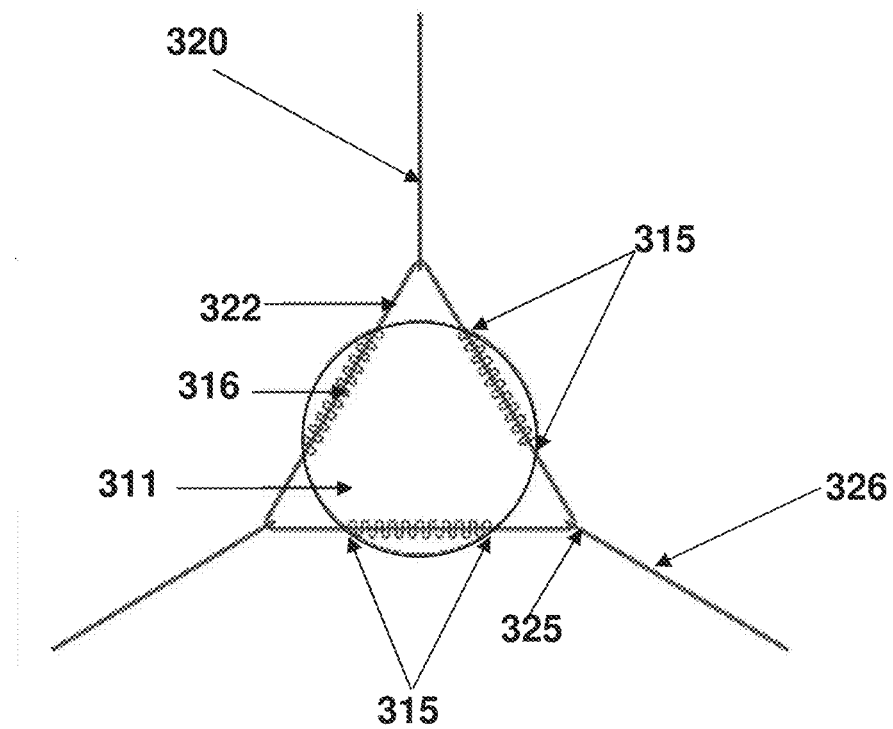
FIG. 3A is a top diagrammatic view of a bottom portion of a floating mat 311 of a coastal resilience system, with FIG. 3A showing the upper surface of the bottom portion before the upper surface of the bottom portion is embedded into the mat, and with FIG. 3A showing components of another illustrative but not necessarily preferred embodiment of an interconnection subsystem 320 positioned on the upper surface.
Figure 3B:
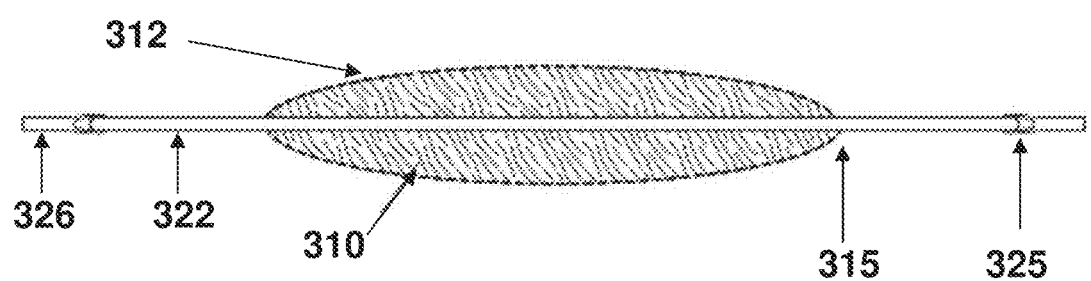
FIG. 3B is a side and sectional diagrammatic view of the mat 311 shown in FIG. 3A as assembled.
Figure 3C:
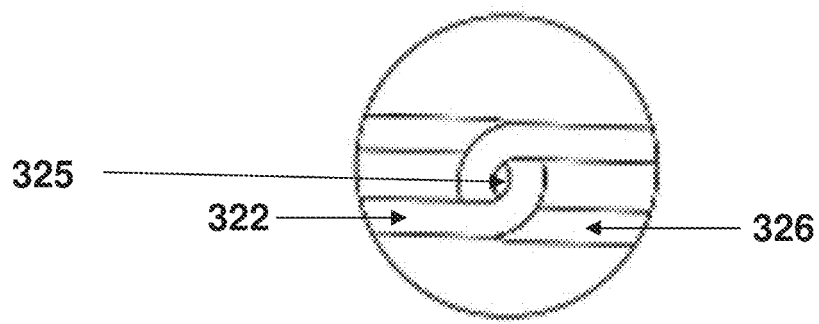
FIG. 3C is a side diagrammatic view of a central hub connection 325 of the yoke 320 shown in FIGS. 3A, 3B.

However, unlike the ropes 122, as shown in FIG. 3A, the yoke ropes 322 for a selected mat 311 need not pass through the center of the mat. Instead, a rope 322 may enter the mat at one yoke site 315, pass through the mat 322, and exit the mat at another yoke site 315. After exiting the mat, the yoke rope 322 may extend from the mat to a hub connection 325 that is external to the mat at the rope's outwardly extending end, and, at the hub connection 325, connect to an outwardly extending end of another yoke rope 322 extending from an adjacent site 315 on the selected mat 311, with the yoke ropes so joined forming a closed polygon. As shown in FIG. 3A, when the mat has six yoke sites 315, the connected yoke ropes 322 form a triangle. When the selected mat has eight yoke sites (as shown in FIGS. 3E1, 3E2, the yoke ropes also may enter the mat at one yoke site, pass through the mat, and exit the mat at another yoke site.

When, as shown in FIGS. 3E,1 two pair of the yoke ropes extend through the mat parallel to each other so as to form a rectangle within the mat, after they extend from the mat, they may form a closed shape, but, because the ropes may be forced to bend to meet, the shape may not be a polygon. They may still connect to an outwardly extending end of another yoke rope extending from an adjacent site on the selected mat, but the bend in the ropes may cause pulling points on or in the mat that could make the mat susceptible to tearing. Such rope bending may be acceptable in systems designed for locations at lower risk of severe storm events.

The yoke ropes instead may connect as does the yoke 120 as shown in FIG. 2, with a rope extending from the mat to a hub connection arranged to connect to an outwardly extending end of another rope connected to an adjacent mat or to the anchoring subsystem, described below. To facilitate distribution of pulling forces on the yoke, nodes 321 may be added at rope junctions in the interior of the mat.

When, as shown in FIG. 3E2, the yoke ropes do not extend parallel through the mat, they may connect to an adjacent yoke rope extending from the mat to join without bending, thus avoiding the pulling points on or in the mat that could make the mat susceptible to tearing. The rope pairs that do not match up to join without bending instead connect as does the yoke 120 as shown in FIG. 2, with a rope extending from the mat to a hub connection arranged to connect to an outwardly extending end of another rope connected to an adjacent mat or to the anchoring subsystem, described below.

When, as shown in FIG. 3F, the selected mat has five yoke ropes (or another odd number of ropes) extending therethrough, the yoke ropes also may enter the mat at one yoke site, pass through the mat, and exit the mat at another yoke site. After exiting the mat, adjacent yoke rope pairs may extend to connect at an external hub connection, with the yoke ropes so joined forming a closed polygon. The mat shown in FIG. 3F may have the additional benefit of increased stability over the mat shown in FIG. 3A, because the rope passages shown in FIG. 3F may be positioned further away from the edge of the mat, which may allow forces to be transported through more of the bulk of the mat, reducing the likelihood of the edge of the mat being torn off during a large storm event. Such connection line passage placement (deeper within the mat) may be more desirable in systems designed for locations at higher risk of severe storm events, In certain embodiments, in order to minimize the number of rope joinders in the yoke, a single rope may be threaded through the mat at adjacent yoke sites so that a single joinder is made to fasten the two ends of the rope to each other.

The hub connection 325 (which may be formed of the same materials as hub connection 125) may also be arranged to connect to one end of a yoke connection line 326, which may itself be formed of the same materials as the yoke connection lines 322 and which is itself arranged to connect at its other end to another hub connection (not shown), which itself may be arranged to connect to another yoke rope (not shown) connected to an adjacent mat (not shown) or to the anchoring subsystem 330, described below.

Figure 3D:
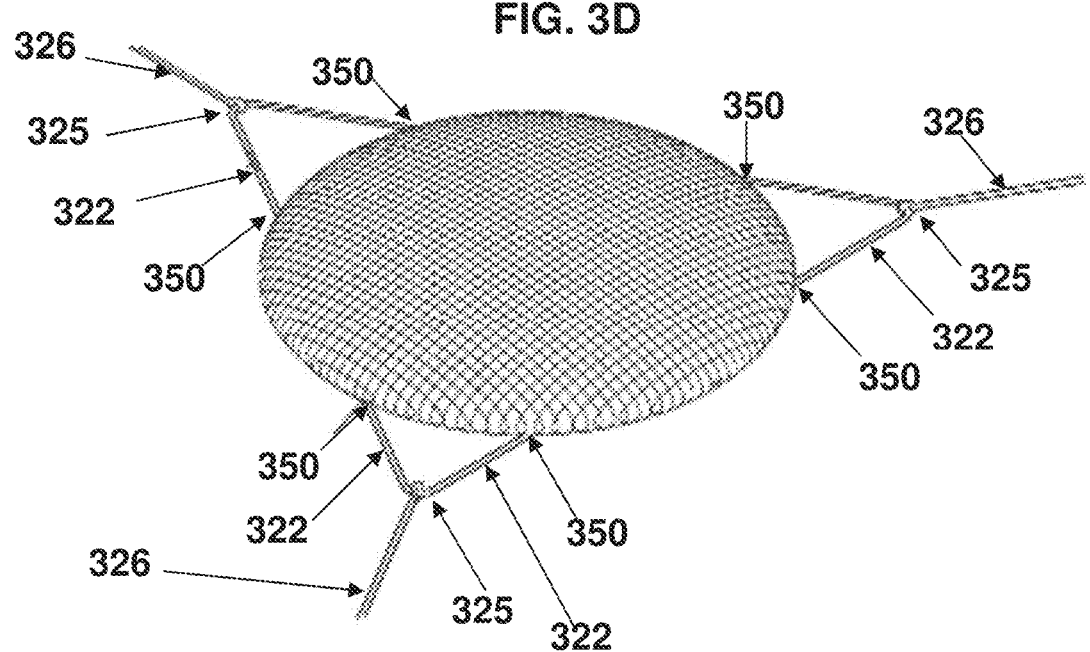
FIG. 3D is a perspective diagrammatic view of the assembled mat 311 and yoke 320.

Further, the hub connection 325 as shown in FIG. 3D provides a node of simple construction. The node 325 may be formed by a yoke rope 322 looped through a loop of a yoke connection line 326. When the yoke rope is a single rope that has been passed through the mat at adjacent yoke sites so that a single joinder is required to fasten the two ends of the rope to each other, securing of the end of the yoke rope at or near at least many of the nodes may be avoided, thus increasing the strength of the yoke line joinders. When an end of a yoke rope does needs to be secured, the joinder may be distanced from the node with the end of the yoke rope positioned parallel with but opposite to itself, allowing for a stronger rope joinder.

FIGS. 3G-K show alternative interconnection systems that may be positioned within a mat.

Figure 3G:
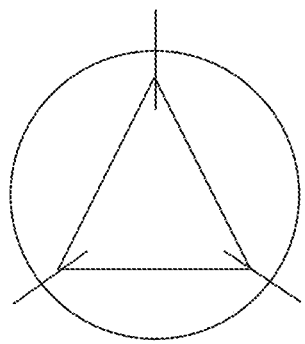
FIGS. 3G-L are top diagrammatic views of a bottom portion of a floating mat, with FIG. 3G-3L showing the upper surface of the bottom portion before the upper surface is embedded into the mat, and with components of other illustrative but not necessarily preferred embodiments of an interconnection subsystem positioned on the upper surface, with FIG. 3G showing an interconnection subsystem with connection lines joined to a triangle, FIG. 3H showing an interconnection subsystem with a rope triangle.

FIG. 3G shows interconnection lines attached to a rigid or semi-rigid inner triangle piece.

Figure 3H:
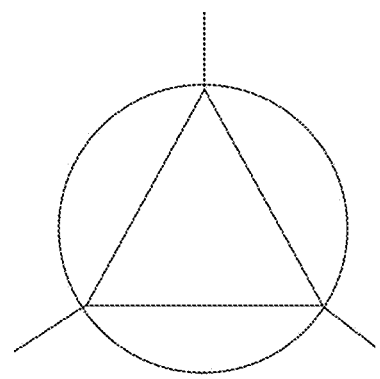

FIG. 3H shows interconnection lines attached to a triangle piece formed of rope or other suitable strand (the rope triangle piece may be formed of a triangular piece of material with rope joined at its ends and disposed around the border of the triangular piece).

Figure 3I:
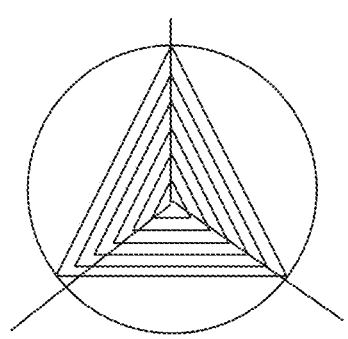

FIG. 3I shows a tension rope axis comprising a set of main interconnection lines extending from yoke sites at the edge of the mat, joining in the center of the mat interior in a center mat node, and attached at a series of mat nodes to a set of ropes disposed in a shape (in this case a triangle) positioned on the upper surface of the bottom portion of the mat. The encasing of the additional ropes joined to the main interconnection lines provides resistance and friction that will render more unlikely any slippage of the main interconnection lines in the mat, as well as significantly reducing the pulling forces on the main interconnection lines by dividing the pulling force over several ropes. In addition, it may be understood that interconnection subsystem components may be fabric rather than a rope, so that the joining of the fabric to the main interconnection lines connection may occur along the fabric rather than at a single point, distributing the pulling force even more significantly. Such uses of fabric within the mat may increase the friction and resistance between the mat and the yoke, even more so should a fabric having networks of holes (such as mesh) be implemented.

Figure 3J:
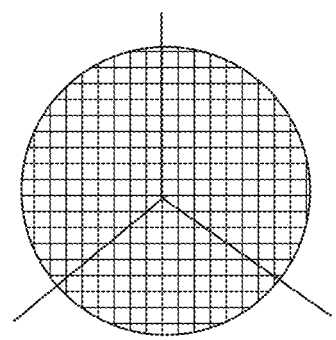

FIG. 3J shows interconnection lines attached to or extending through a tension rope mesh that may cover the upper surface of the bottom portion of the mat (and in certain embodiments may have its outer edges secured to the edges of the mat) and may have the interconnection lines joined to the tension rope mesh at least at an intersection point within the tension rope mesh.

Figure 3K:
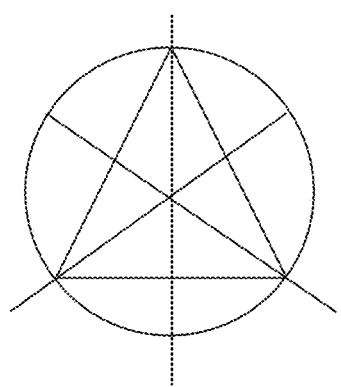

FIG. 3K shows an interconnection subsystem with a rope network having ropes extending end to end on the upper surface (and in certain embodiments, the network may have its outer edges also secured to the edges of the mat). Further, the interconnection lines may be joined to the tension rope network at the edges of the network or at a plurality of intersection points within the rope network.

Figure 3L:
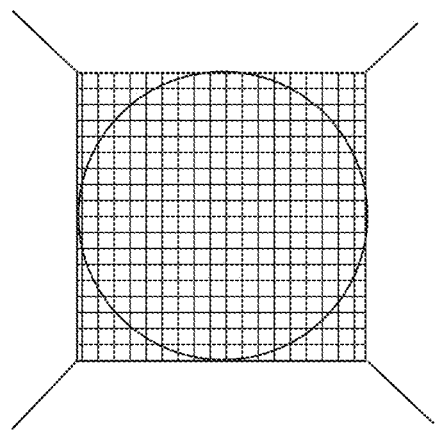

FIG. 3L shows an interconnection subsystem with a rope mesh that extends beyond the edge of the bottom portion, with the ropes of the rope mesh extending vertically and horizontally and the externally disposed interconnection lines attaching to the rope mesh diagonally at the rope mesh's edge points. The diagonal attachment of the external interconnection lines to the rope mesh causes pulling forces on the externally disposed interconnection lines to be distributed more uniformly across the rope mesh, thus significantly reducing the impact of the pulling forces.

Although triangular shapes are shown in FIGS. 3G-3K and a rectangular shape is shown in FIG. 3L, it may be understood that the shapes of the interconnection component may be any suitable shape at the selection of the designer. Further, it may be seen that the looping design of the hub connection 325 may be suitable for use in the interconnection subsystems shown in FIGS. 3G-3L.

The mat 311 may have an enclosing layer (or layers) 312, also known as a cover, and a frictional connection 316 between the yoke 320 and the other materials of the core of the mat 311. The frictional connection 316, although not shown in FIG. 1A or FIG. 2, may also be applied around the yoke ropes within the mat 111, to provide additional friction between the ropes and the mat in order to minimize slipping of the ropes within the mat. The frictional connection may be formed of a rough material encasing the ropes. It may also be a hook and loop connector such as the VELCRO™ fastener systems available from VIL Ltd. of London, UK, with one portion of the fastener system disposed around or on the rope and the other portion of the fastener system disposed around of in the rope passage within the mat. In other embodiments, the ropes themselves may be constructed of a spiky material to introduce additional friction between the ropes and the mat.

In another embodiment, the multiple ropes 322 described herein as extending through the mat may be a single rope that is threaded through multiple passages in the interior of the mat with its end joined in one location in the interior of the mat or external to the mat to form the polygon. In addition, while the ropes are described herein as passing through the mat, it is to be understood that, at the election of the designer, the ropes may be positioned in the mat at manufacture and need not physically move through passages within the mat.

While, in certain embodiments of the coastal resilience system disclosed herein, a designer may allow for some or limited slippage of the ropes relative to the mat, in installations of the coastal resilience system in locations at high risk of large storm events, the ropes may be rendered completely unmovable relative to the mat in order to facilitate the distribution of forces applied to components of the coastal resilience system.

Anchors

It may be seen that a coastal resilience system as disclosed herein may include an anchoring subsystem 130 to flexibly link the network of any number of interconnected mats to the seafloor via the interconnection subsystem 120 of yoke ropes and yoke nodes, thus preventing the network of mats from drifting out of place. The anchoring subsystem 130 may have an anchoring line 132, which may be flexible rope-like connections formed of the same materials as the yoke connection lines 122, and may be arranged to connect at one end to a yoke node 125 and at the other end to an anchoring element at or near the seafloor.

The moorings 135, which link the entire network to the sea floor, may be block moorings or other conventional anchoring items for attaching, weighting, or mooring nautical items to the sea floor or to other fixed points. In other embodiments, the system 100 may be anchored to the seafloor with small weight or friction moorings. In certain embodiments of the system 100, the moorings 135 may be all the same, or they may be different to accommodate varying conditions on the seafloor. Further, the anchoring subsystem components may be formed of standard marine hardware, such as filament rope, shackles, connectors, rigging, etc. that likely do not require special manufacturing.

The mooring 135 or other anchoring attachment points may be located in places that ensure that the forces and movements on the anchor lines 132 are distributed through the system to minimize risk of damage to the mats or plant growth by scraping or other concentrated loads. The distribution of the floating mats, the size and shape of the mats, and other aspects must be customized for local conditions and may vary for other reasons, however, the basic components and functioning are the same for any location.

Stages

Manufacturing Stage

The coastal resilience systems disclosed herein may be created in modular form as a "kit of parts" to allow for mass-manufacturing, preassembling, modular interlinking and/or efficient deployment. The coastal resilience systems disclosed herein may be constructed with conventional materials that are selected by the designer to have physical properties that satisfy the relationships outlined herein. Additionally, specific materials may be selected based on their availability, local conditions or regulations, and other factors. The selected materials may be interchanged if their material properties and behaviors suit and to facilitate integration with the overall apparatus.

Unlike many other approaches to coastal resilience infrastructure, the mats used in the systems disclosed herein are very simple to fabricate off-site, transport, and install. Further, mats, yoke, and anchoring subsystems may be assembled during manufacturing, with the method of affixing these components together varying based on the specific choice of material for each component.

The mats may be formed by any conventional process, such as molding, weaving, stuffing a material into a cover (formed of any conventional method or materials, woven, non-woven, braided, or knitted, fleece, or plastic, artificial, or natural materials, cloth or net, or warp wrap). As noted above, the yoke lines may also be sandwiched between a bottom of the mat and a dense mesh that covers the mat. The dense mesh cover may be formed of a fibrous, porous, or filamented material such as recycled centrifugally-spun fibrous plastic, matted coconut fiber or any other commonly available materials that will that provides a suitable bed for the growth therethrough of semi-aquatic plants 10 such as marsh grass and other local semi-aquatic plant varieties, or the attachment thereon of marine animals such as shellfish or barnacles, or the disposal of themselves into or onto the mat or substrate.

In certain embodiments, the yoke lines, and if used, the node 222 may be disposed in the interior of the mat. They may be pushed or pressed into the mats or passed or threaded through a mat. As noted before, it is to be understood that references made to passing or threading yoke ropes through a mat were and are meant to include other forms of positioning the ropes in the interior of the mat. In certain embodiments, a top portion and a bottom portion of the mat may be constructed, with each portion having a complementary surface that will fit together when the portions are joined to form a unitary mat. The mat's associated yoke lines may be positioned on the complementary surface of one of the portions, and then the portions joined together, for example by fusing. In certain embodiments, the yoke lines, and if used, the node may be pushed or pressed into the complementary surface; in other embodiments, channels may be formed in one or more of the complementary surfaces to receive the yoke lines. In certain embodiments, the yoke components may be immobilized in the interior of the mat by fusing an upper portion of the mat to a bottom portion or by filling the passages, once the yoke lines are positioned in them, with a substance that naturally conforms to the space available; in other embodiments. Especially in systems designed for locations at lower risk of severe storm events, the channels may be sized large enough to allow a certain amount of movement of the yoke components relative to the mat.

The connection lines may be ropes, filament lines, fibrous strands, rigging, or wires formed of any suitable conventional flexible, durable, and water-tolerant or standard marine hardware, such as filament rope, shackles, connectors, rigging, etc that likely do not require special manufacturing.

As part of the pre-assembly of the coastal resilience system, some or all of the anchoring subsystem components may also be attached to the interconnection system during the manufacturing stage. The anchoring lines may be attached to the nodes, and the moorings may also be attached to the anchoring lines. Alternatively, the attachment of some or all of the anchoring subsystem components may be attached during deployment.

Further, the dense mesh may be fused to the bottom of the mat, accomplished by heating the material, pressing the material, and/or using solvents. Alternatively, dense mesh may be attached to the bottom of the mat with a hook and loop connector such as the VELCRO™ fastener systems available from VIL Ltd. of London, UK.

The mats may be prepared for deployment by pre-coating them with materials that support marsh grass and/or other semi-aquatic flora. Seeds, fertilizers, plugs of plant rhizome, or other conventional media growth medium for the plant growth may be added to begin or accelerate the growth of the semi-aquatic plants. The mat's bottom surface, which is arranged to be submerged and to attract growth from various native seaweeds and other aquatic plant and animal life, may have applied to it a biomass support substrate. As noted before, the bottom surface may be rough, porous, or formed of a hard material. Lithiophilic plant sporophytes may colonize the bottom surfaces and continue to accumulate through yearly growth cycles. The result is a modular platform having significant mass from the biometer growing on and through it—marsh peat and grass above, and seaweed and other aquatic growth below.

In the embodiments in which a hard, rough surface is attached to the bottom of a mat, the rough yet rigid and strong material properties encourage the growth of aquatic plant life and other marine animals; they also serve to add cohesion strength to the mat to make it more rugged.

Deployment Stage

The coastal resilience systems disclosed herein may be deployed near a coastal shoreline. The system's array of interconnected and anchored floating masses provides an overall network-based inertia that resists and dissipates the physical energy of surface gravity waves and impedes water flow.

The coastal resilience system, having been pre-assembled into its network of mats and its yoke and (optionally) the anchoring subsystem components, may be launched into the water and manipulated as necessary to position them and link them together according to the overall plan of the designer's preferred system implementation. Channels and pathways (shown in FIG. 4A, 4B), floating docks, inhabitable platforms, and other apparatuses and accessories may be added for access through the mats, for observation, and for other functions.

Operational Stage

After the coastal resilience system is deployed, its array of interconnected and anchored floating masses provides a floating venue for supporting and promoting bioremediation; habitats for wildlife, and green and recreational space for human enjoyment and study. In addition, the system provides an off-shore venue for increased network-based inertia to resist and dissipate the physical energy of surface gravity waves and impede water flow during storm events, thus reducing the frequency and scale of coastal flooding and storm surge.

After deployment, the dense rhizomatic root system of the plants may begin to grow on and through the networked mats of the system. After enough growth cycles over time, the plant growth may become thick and extremely rugged, and the floating mats may become entirely overgrown with biomatter both below and above the water line, with human-made materials barely visible or not even visible at all. This is both more aesthetically pleasing and much more rugged, as the strength of the artificial and natural materials reinforce one another.

The peaty root system of marsh grass grows throughout the artificial mesh making a dense rhizomatic mat that helps sediment that would normally just pass by "stick" in the vicinity to accumulate and influence current and tide driven deposits. The mat may be waterlogged, but the biomatter is self-buoyant so that the large air bladders or hulls are not required to keep the mat afloat. Further, as the biomatter increases, the mats and yoke components are bound together even more closely by fostering growth and harborage of biomatter onto the mats. Finally, as tide-transported sediment capture and accumulate on the floatable mats, the mats become heavier and therefore even more stable in a significant storm event.

Figure 4A:
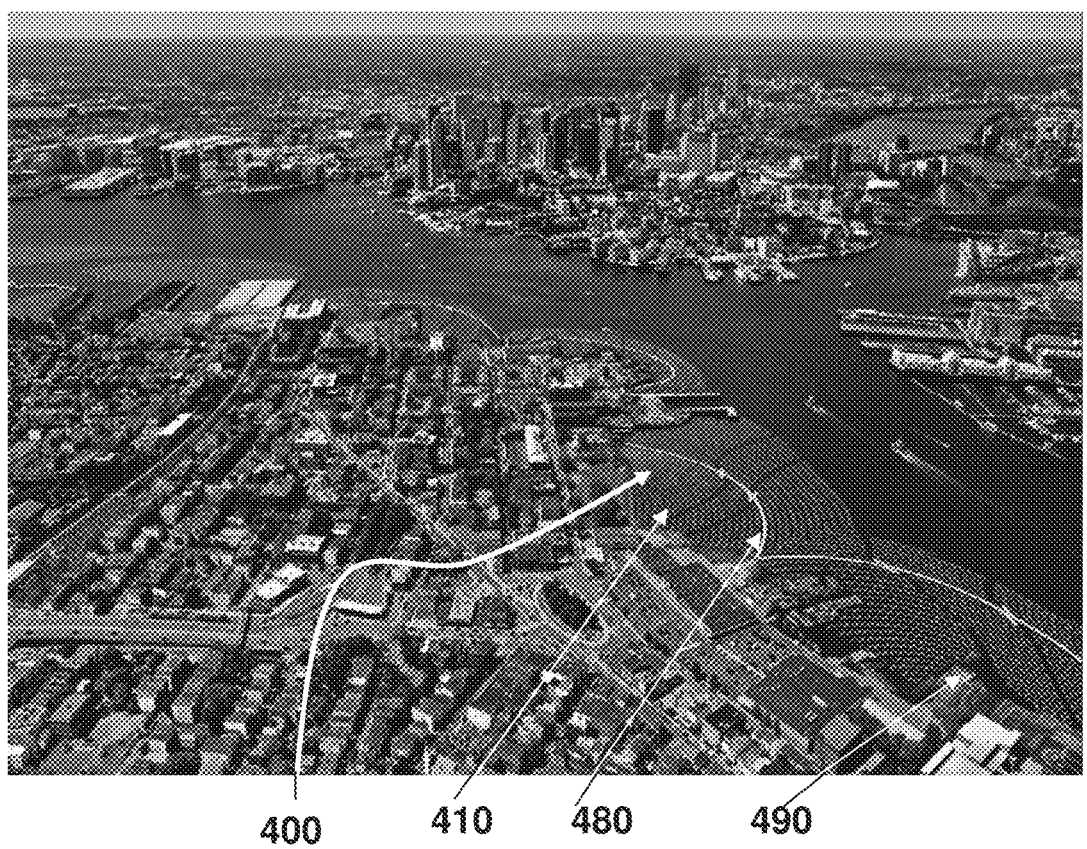
FIG. 4A is a diagrammatic view showing another illustrative but not necessarily preferred embodiment of a fully networked implementation of a coastal resilience system 400 installed near the shoreline of a major city and featuring floating foot paths 480 and channels 490 disposed within a fully networked system of mats 410.
Figure 4B:
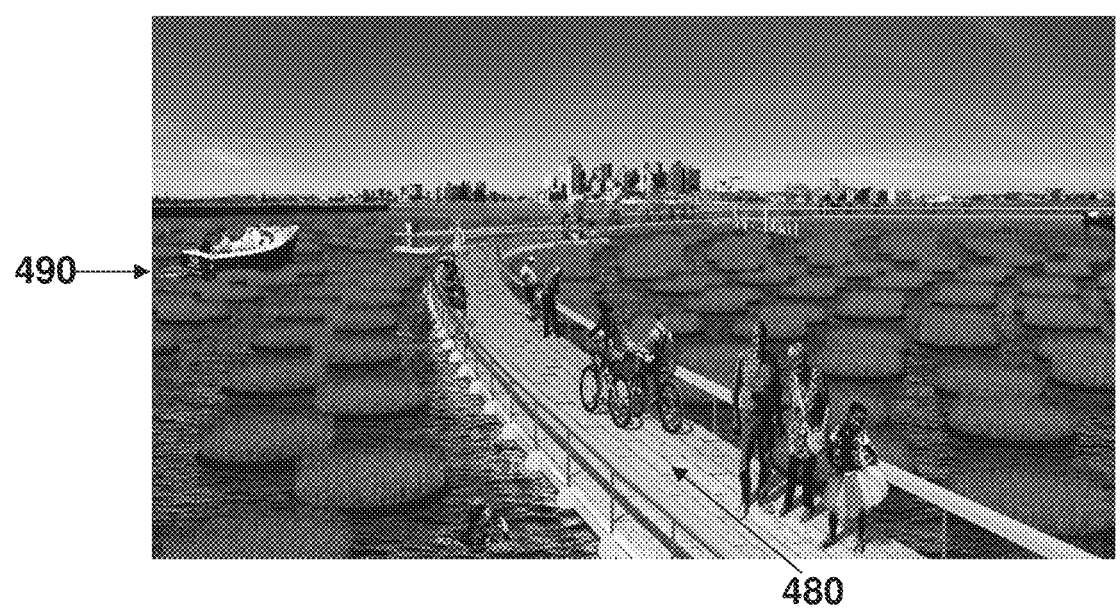
FIG. 4B is more detailed perspective view of a floating foot path 480 and channel 490 as shown in FIG. 4A.

FIG. 4A is a perspective view of an illustrative but not necessarily preferred embodiment of a coastal resilience system such as the system 100 installed near the shoreline of a major city, in which a fully networked system 410 of interconnected mats 411 are installed along with floating foot paths 410 and channels 420, which allow people to access the network of mats with their green floating areas. As seen in FIG. 4B, the possible co-benefits of access during fair weather to a floating mat infrastructure include but not limited to access for activities such as fishing, shellfishing, strolling, exercising, studying wildlife (flora and fauna). Beneficiaries may include students, naturalists, or any inhabitant that wants to enjoy the greenery and the ocean.

When the weather is not so fair, the network of mats reduce the frequency and scale of coastal flooding and storm surge. First, the floating mats themselves impede the flow of water shorewards. The mats, disposed at surface-level, disrupt the surface of the water and so slow the flow of water at the surface. In addition, as the mass of the plant growth on the mat increases, the weight of the mat increases, increasing the mat's contribution to the inertia that resists and dissipates the physical energy of surface gravity waves and impedes water flow. The high submerged surface area of the mats (due to the stringiness, roughness, and expanse of seaweed growth) increases the effective viscosity of the water below. Each mat becomes very heavy, and high-friction in relation to the surrounding water—as such it can resist very high physical forces.

Further, the networking of the mats increase the inertia of the system of mats by transferring and dissipating the physical energy of surface gravity waves across the network of mats. Without the force transfer that the interconnection subsystem enables, the floating mats would simply bob over larger waves. Instead, the energy dissipation that the floating mats accomplish during storm events is amplified by the transfer and distribution of counteracting forces across the network from one mat to the others as the mats are lifted and pull on each other. The interconnections serve to further distribute any forces of displacement (vertical or lateral movements from wave action) from one floating mat on through the network, thereby leveraging the mass of many mats to counteract movement of any of them.

The embedded tension yokes inside each mat transfer pull forces and shear forces throughout the horizontal extent of the mat rather than to a single point on it. Because the yoke ropes exit the mat at multiple yoke sites along the edge of the mat (in some embodiments the yoke sites are also distributed evenly around the edge), when the mat is subjected to a large yank or shear force the forces exerted on the mat are distributed around the edge of the mat, preventing the mat from being ripped apart.

More specifically, during a strong wave event, pulling forces are applied to the interconnection lines external to the mat. As pulling forces ripple through the yoke, the hub connections external to the maps reduce the pulling force on an interconnection line in an amount proportional to the number of ropes that are also connected to the hub connection. As the pulling forces extends along an interconnection line into a mat, the pulling force on the line are also reduced by amounts also proportional to the multiple number of ropes that are connected to the multiple mat nodes.

The efficiency of the force transfer is based on the selection by the designer of the number and types of mats, ropes, nodes, and the anchoring system, but the rope, nodes, and yoke points of the interconnection subsystem serve to transfer the forces among and across the system components minimizing damage to the mats, and the storm protection performance of the system as a whole is an emergent property.

Maintenance Stage

The risk of catastrophic failure of a coastal resilience system as disclosed herein is extremely low. Once well established the plant growth is self-sustaining; and most if not all breakage of the system components may be repaired at the spot of failure. Entire components can be swapped out if necessary. The coastal resilience systems here described are inherently redundant, with multiple connections between units and regular anchorings. If any piece breaks, the system as a whole will more or less perform as before, at least for the duration of a crucial storm or until it is repaired. Additionally, since components are flexible and soft, inadvertent contact with system components is much less likely to be harmful. In the worst scenario, the case of vandalism or accident, even a free-floating piece will not damage person or property, and will not pollute or harm any marine life.

Advantages

The disclosed coastal resilience systems represent a manufacturable floating biomatter kit-of-parts infrastructure that achieves coastal resilience and reduces flood risk and damage. They provide a distinct advantage over heavy engineered blockades, being easily manufacturable and deployable without heavy construction machinery or materials or considerable maintenance requirements, and is very low-cost as a result. The components are extremely rugged, and the biomatter that grows actually binds the other materials together even more tightly. The result is a single unit that withstands a variety of forces; it is moderately flexible and soft, and is therefore resilient and robust. The rest of the hardware may be quite standard and simple to maintain or repair.

It can be seen that the disclosed nearshore anchored systems of and structures for coastal resilience disclosed here. For example, the systems and structures disclosed herein provide an interconnected network of floating biomatter-heavy mats that may be deployed quickly, flexibly, and easily to act as disruptors of wave energy and storm surge flux. They provide many advantages over conventional storm protection structures and systems. Fundamentally, the systems are nature-based, relying on the properties of various plants and their associated ecological cycles. The biomatter growth is virtually free; it accumulates mass naturally over time, and is therefore much cheaper by weight compared to manufactured or inorganic materials. Further, the human-made components of the system are cheap, recycled, and light.

The floating mats for supporting biomatter-growth may act as a cheap and reliable first line of defense that does not require costly (and carbon-intensive) earthmoving, structural concrete, structural steel, or hydrocarbon-seeping materials. The biomatter that grows and accretes over time adapts to the local environment and increases mass for physical dampening effects, and provide many co-benefits, such as bioremediation (cleaning toxins from the runoff and seawater), habitats for wildlife, and a new kind of public green space that is accessible by boat or floating pathway. Such systems and structures form a new kind of "soft" resilience infrastructure that provides protection from the forces of nature using nature itself rather than heavy engineered blockades that are more expensive and detrimental to the environment and the community.

It may be seen that the systems disclosed herein provide efficient coastal resilience without the need for expensive or complicated elements such as air bladders or hulls for flotation. The simple permeable design of the floating mats and the properties of the manufactured materials and the plant matter make the mats both massive and buoyancy-positive. As a result, they are simple to manufacture and maintain.

Further, the materials from which the system is constructed and the technologies employed to construct, operate, and maintain the system already exist, resulting in a completely new solution for low-cost, low-carbon coastal resilience infrastructure. In addition, the systems disclosed herein do not require the use of structural steel, structural concrete, earth-moving, or carbon-heavy materials/processes to stop incoming water or absorb/dampen wave energy. They do not employ invasive engineering that would require in-place construction or underwater installation (which could seriously disturb existing ecosystems). In addition, the seaweed and marsh grass, which help to remove human-made pollutants and organic imbalances may be native species, and are a vital part of an ecosystem's bioremediation.

In short, the systems disclosed herein help the ecosystem rather than harming it or polluting it.

One of the ways that the systems disclosed herein help the shoreline ecosystem is that they do not use any barriers that would fully block the natural flow of seawater based on normal tides, or block access by people, boats, or biota. By contrast, implementations of the systems disclosed would impede water flows locally, generally close to the site of water intrusion onto land. As such, they would be built to avoid shipping lanes and other reserved areas, and can easily be reconfigured or temporarily moved for access.

The biomatter providing inertia that dampen the storm surges and coastal flux and is accumulated by natural growth processes after the mat is deployed, making the initial logistics much easier. In addition, the natural growth and accumulation of biomatter facilitate control of tidal-borne sediment by "trapping" sediment and accumulating and accumulating it in a defined location space in order to build reserve sediment such as sand to make new land or to solidify a beach/marsh for land protection.

Further, management of the systems disclosed herein do not require the use any embedded electronics or sensors, which are easily damaged and quickly become obsolete. The performance of the system and its biological health may be monitored by satellite, drone imagery, measurement, and/or modeling when necessary.

From a local environmental perspective, the plants are natural bioremediation agents and they improve local water quality and wildlife habitat conditions. Globally, the system as a whole is carbon-negative and functions to disrupt wave energy and storm surge flux and to capture and accumulate tide-transported sediment without considerable human intervention. And architecturally, the infrastructure is beautiful and accessible, and as such it may be used as a public park, a place for fishing or shellfishing, and a place to learn about resilience and ecology.

Although the disclosed components have been described above as being separate units, one of ordinary skill in the art will recognize that functionalities provided by one or more units may be combined. As one of ordinary skill in the art will appreciate, one or more units may be optional and may be omitted from implementations in certain embodiments.

For example, in one configuration, the anchoring subsystem may be incorporated into the interconnection subsystem. Further, in other embodiments, certain nodes may be omitted.

The foregoing descriptions have been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments. For example, the tension yokes of the fully networked coastal resilience system disclosed herein may have three, four, or six node points, although any number is possible. In addition, a single yoke rope may be doubled for strength and for ease in constructing nodes such as the node 325 disclosed above. It is to be understood that the proportions, lengths, connection locations, and other aspects of the system components disclosed herein may vary, and the precise relationships between sizes, masses, lengths, and interconnection placement are aspects of the design that may be left to the designer to adjust based on local conditions as well as the tuning of the overall properties for performance of the system as a whole.

It is intended that the specification describing a coastal resilience system and examples be considered as exemplary only, with a true scope and spirit of the invention being indicated by the following claims.

The invention claimed is:

1. A coastal resilience system comprising:
  an interconnected network of floatable mats arranged to be positioned in a body of water in a desired location near a shoreline, and having a selected mat:
    arranged to support growth, attachment, or positioning of biomatter thereon or therein,
    arranged to be at least partially submerged in the body of water, and
    having an edge with at least three yoke sites spaced around and along the edge; and
  an interconnection subsystem having
    a plurality of connection lines arranged to flexibly connect the selected mat to adjacent floatable mats, the plurality of connection lines having ends that extend out of an interior to an exterior of the selected mat,
    interconnection components arranged to be positioned within the selected mat and arranged to be connected, at a plurality of force transfer points or regions within or near the interior of the mat, to other interconnection components positioned within the selected mat,
    a desired number of connection loops along or near an edge of the selected mat arranged to connect the adjacent mats directly or indirectly and flexibly to the selected mat, wherein the desired number of connection loops are arranged to connect the ends of a pair of the connection loops adjacent to each other exterior to the selected mat, and
    a connection node arranged to connect the ends of the pair of the connection loops adjacent to each other exterior to the selected mat.

2. The coastal resilience system of claim 1,
  wherein the selected mat has a biomatter support substrate, at least a portion of which is arranged to be submersible in the body of water; and wherein the biomatter support substrate is arranged to support growth of semi-aquatic plants thereon or to support attachment of or positioning of marine animals thereon or therein.

3. The coastal resilience system of claim 2, wherein the biomatter support substrate further comprises a simulated root system extending downwardly from the selected mat into the body of water.

4. The coastal resilience system of claim 3, wherein the simulated root system further comprises a plurality of strands attached directly or indirectly from a bottom surface of the selected mat.

5. The coastal resilience system of claim 1,
wherein the at least three yoke sites include a first yoke site and a second yoke site that is different and spaced apart from the first yoke site, and
wherein a selected connection line is arranged to extend in a straight line from the first yoke site, through the interior of the selected mat, and to exit the selected mat through the second yoke site.

6. The coastal resilience system of claim 5, wherein the selected connection line is arranged to intersect with another connection line at an intersection position in the interior of the selected mat.

7. The coastal resilience system of claim 6, further comprising a mat node for connecting the selected connection line and the another connection line at the intersection position.

8. The coastal resilience system of claim 7,
wherein the at least three yoke sites comprise
a third yoke site that is different and spaced apart from the first yoke site and the second yoke site, and
a fourth yoke site that is different and spaced apart from the first yoke site, the second yoke site, and the third yoke site; and
wherein the another connection line is arranged to extend from the third yoke site, through the interior to the intersection position, and to the fourth yoke site.

9. The coastal resilience system of claim 6,
wherein the at least three yoke sites comprise a third yoke site that is different and spaced apart from the first yoke site and the second yoke site; and
wherein the another connection line is arranged to extend from the third yoke site through the interior to the intersection position, and is further arranged to be secured at a mat node to the selected connection line at the intersection position.

10. The coastal resilience system of claim 5, wherein the selected connection line is arranged to extend through the interior of the floating mat but not through a center of the interior of the floating mat.

11. The coastal resilience system of claim 10,
wherein the at least three yoke sites comprise
a third yoke site that is different and spaced apart from the first yoke site and the second yoke site, and
a fourth yoke site that is different and spaced apart from the first yoke site, the second yoke site, and the third yoke site; and
wherein the another connection line is arranged to extend in a straight line from the third yoke site, through the interior of the floating mat but not through a center of the interior of the floating mat, and to the fourth yoke site.

12. The coastal resilience system of claim 1, further comprising hub connections to flexibly connect the connection lines to other connection lines or to an anchoring subsystem arranged to flexibly anchor the interconnected network into position at the desired location, wherein at least one of the hub connections comprises a first connection line that is passed through a loop of a second connection line.

13. The coastal resilient system of claim 12, wherein the first connection line is arranged after the looping to extend a selected length along the first connection line but in the opposite direction away from the looping, along the first connection line.

14. The coastal resilience system of claim 1, further comprising a frictional connection between the positioned interconnection components and the interior of the selected mat.

15. A method comprising connecting a selected mat to adjacent mats in a network of floatable mats positioned in a body of water in a desired location near a shoreline, by
positioning a plurality of interconnection components within an interior of the selected mat in the network of floatable mats,
connecting, at a plurality of force transfer points or regions within or near the interior of the selected mat, the positioned interconnection components to other interconnection components positioned within the selected mat,
forming, from the positioned interconnection components, a desired number of connection loops along or near an edge of the selected mat for connecting the adjacent mats directly or indirectly and flexibly to the selected mat, and
connecting, with a mat node at an intersection position in the interior of the selected mat, one connection line that is positioned in one straight line with another connection line that is positioned in another straight line, when the one straight line intersects with the another straight line at the intersection position.

16. The method of claim 15, further comprising binding the mats and the connection lines by fostering growth or harborage of biomatter onto the mats.

17. The method of claim 15, further comprising positioning a plurality of connection lines within the selected mat across the interior of the selected mat along a plurality of straight lines that extend edge to edge across the interior of the selected mat.

18. The method of claim 15,
wherein forming the desired number of connection loops further comprises connecting ends of a pair of connection lines that extend adjacent to each other out of the interior to an exterior of the selected mat; and
wherein the connecting comprises joining the ends with a connection node.

19. The method of claim 18,
wherein the pair of connection lines ends comprise a first connection line with a first end and a second connection line with a second end, and
wherein joining the ends with the connection node further comprises looping the first end of the first connection line over the second end of the second connection line.

20. The method of claim 19, wherein joining the ends with the connection node further comprises, after the looping, extending the first end a selected length along the first connection line but in the opposite direction away from the looping.

21. The method of claim 20, wherein the pair of connection lines comprises a single connection line that is positioned in the selected mat across the straight lines.

22. The method of claim 15, further comprising forming at least one of the desired number of connection loops by positioning a length of connection line within the selected mat across the interior of the selected mat along a pair of the straight lines extending edge to edge across the interior,
- with the pair comprising a first straight line and a second straight line,
- with the first straight line having an end located on the edge of the selected mat at a first yoke site, and
- with the second straight line having a beginning located on the edge of the selected mat at a second yoke site that is adjacent on the edge to the first yoke site;

wherein the positioning further comprises:
- extending the length of connection line along the first straight line,
- exiting out of the selected mat at the first yoke site,
- extending loosely away from and back to the selected mat, and
- entering the interior of the selected mat at the second yoke site.

23. The method of claim 15, wherein connecting with the mat node further comprise looping the one connection line over the another connection line.

24. The method of claim 15, further comprising binding the mats and the connection lines by facilitating capture and accumulation of tide-transported sediment on the mats.

* * * * *